Nov. 5, 1968  L. K. MURRAY  3,409,406
APPARATUS FOR THE PRODUCTION OF CARBON BLACK
Filed Dec. 13, 1965  2 Sheets-Sheet 1

INVENTOR
L.K. MURRAY
BY
*Young and Quigg*
ATTORNEYS

Nov. 5, 1968  L. K. MURRAY  3,409,406
APPARATUS FOR THE PRODUCTION OF CARBON BLACK
Filed Dec. 13, 1965  2 Sheets-Sheet 2

INVENTOR
L. K. MURRAY
BY
ATTORNEYS

United States Patent Office 3,409,406
Patented Nov. 5, 1968

3,409,406
APPARATUS FOR THE PRODUCTION OF CARBON BLACK
Lawrence K. Murray, Bartlesville, Okla., assignor to Phillips Petroleum Company, a corporation of Delaware
Filed Dec. 13, 1965, Ser. No. 513,470
6 Claims. (Cl. 23—259.5)

ABSTRACT OF THE DISCLOSURE

A carbon black furnace comprising an elongated first cylindrical chamber, a second elongated cylindrical chamber having a diameter greater than said first chamber and being in communication with and in axial alignment with said first chamber, and an elongated third cylindrical chamber having a diameter less than the diameter of said first chamber and in communication with said second chamber with the bottom of said third chamber in horizontal alignment with the bottom of said second chamber, said first chamber having means for introducing a reactant hydrocarbon and a free-oxygen-containing gas therein.

---

This invention relates to apparatus for the production of carbon black. In one aspect this invention relates to an improved carbon black furnace. In another aspect this invention relates to an improved method for producing carbon black.

In the prior art manufacture of FEF and GPF carbon black employing tangential flame processes, it is customary to employ the same carbon black reactor or furnace for making said carbon blacks and to vary the operating conditions in said furnace depending upon which type of carbon black is being manufactured. In order to produce carbon black economically at high rates the reactors or furnaces employed need to have a large internal volume in order to provide the necessary reaction space. In one type of furnace employed, the reaction zone comprises a first section having a length larger than its diameter; for example, a diameter of about 24 inches and a length of about 10 to 11 feet. This first section is followed by a second section also having a length larger than its diameter but having a diameter greater than the diameter of said first section; for example, a diameter of about 40 inches and a length of 9 to 10 feet. Said first and second sections are connected together in axial alignment.

It is also customary to connect a smoke transfer line to the downstream end of said second section for transfer of the smoke (carbon black product suspended in reaction zone gases) to the carbon black separation equipment. Said transfer line is customarily of smaller diameter than either of said first and second sections and is connected in axial alignment with said first and said second sections.

The above-described arrangement and alignment of said first section, said second section, and said transfer line has given good results in the manufacture of carbon black. However, when furnaces constructed in such a manner are operated over extended periods of time, it has been found there is some settling of carbon black in the lower portion of the downstream end of the second section of the furnace. This settled carbon black fills the downstream end portion of said second section below the entrance to the transfer line. This reduces the volume of the reactor, changes the operating conditions within the reactor, and affects the quality of the carbon black product. Also, the carbon black that settles tends to solidify and cake. Eventually, said settled carbon black cakes to the extent that it will begin to flake off and pass out of the second section along with the carbon black product contained in the smoke. This flaked carbon black tends to foul the carbon black separation equipment and contaminate the carbon black product. The major portion of said caked carbon black is usually so hard that it cannot be chipped out without damaging the refractory lining of the furnace. This makes it necessary to periodically shut down the flow of make hydrocarbon to the furnace and burn out the caked carbon black. This results in a loss of valuable production time.

The present invention provides a solution for the above problems by providing a carbon black furnace or reactor and method wherein the settling of carbon black and the resultant caking of the settled carbon black is eliminated. In accordance with the present invention, a transfer conduit or a third reaction section is provided downstream of said second reaction section, and the bottom of said transfer conduit or said third reaction section is in horizontal alignment with the bottom of said second section of the furnace. Thus, the pocket where settled carbon black can collect in the prior art furnaces is eliminated, there is no accumulation of carbon black in the furnace, and the above-described problems are eliminated.

An object of this invention is to provide an improved apparatus for the production of carbon black. Another object of this invention is to provide an improved carbon black reactor or furnace. Still another object of this invention is to provide an improved carbon black reactor or furnace which can be employed in the manufacture of either FEF or GPF carbon black. Another object of this invention is to provide a carbon black furnace or reactor wherein the problem of settled and/or accumulated carbon black, and the problems associated therewith, are eliminated. Another object of this invention is to provide an improved method for making carbon black. Other aspects, objects, and advantages of the invention will be apparent to those skilled in the art in view of this disclosure.

Figure 1:
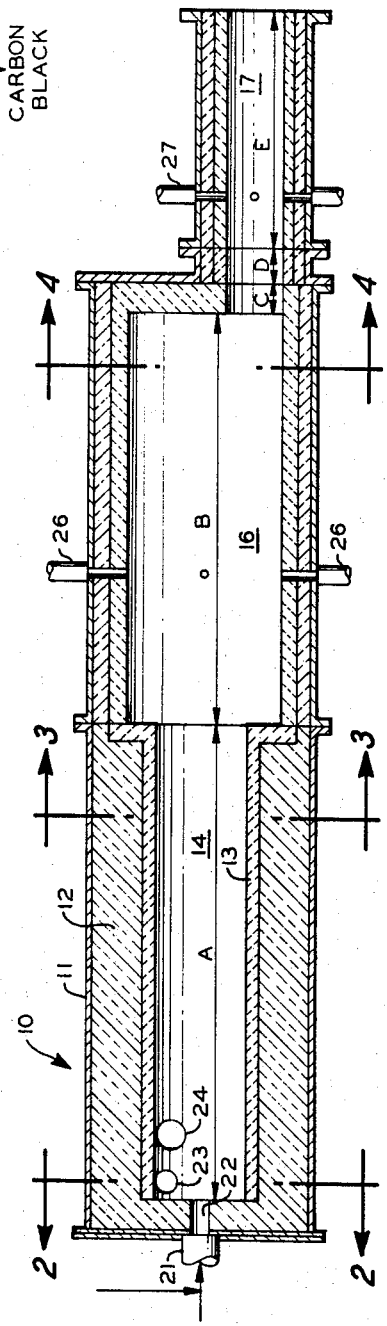
FIGURE 1 is a view in elevation, partly in cross section, of a carbon black furnace in accordance with this invention.

Referring now to the drawings, the invention will be more fully explained. In FIGURES 1-4 the furnace designated generally by the reference numeral 10 in FIGURE 1 comprises a steel outer shell 11, an intermediate layer 12 of a suitable heat insulating material such as "Kaocast," and an inner lining 13 of a suitable refractory material such as "Carbofrax." "Kaocast" is a trademark for a 3000° F. kaolin base, refractory castable material available from Babcock and Wilcox, Refractories Division. "Carbofrax" is a trademark for a high grade silicon carbide refractory, at least 85 weight percent silicon carbide, supplied in shapes or bulk cement form by the Carborundum Company. Other suitable refractory materials can be employed. Those skilled in the art will know of such other materials.

Said furnace comprises a first generally cylindrical, horizontally disposed section defining a first chamber 14 having a length greater than its internal diameter. Connected to the downstream end of said first section is a second generally cylindrical, horizontally disposed section defining a second chamber 16 which also has a length greater than its internal diameter. The internal diameter of said second chamber 16 is greater than the internal diameter of said first chamber 14. Said second chamber 16 is in open communication with said first chamber 14 and is in axial alignment therewith. A third generally cylindrical, horizontally disposed section defining a third chamber 17 is connected to the downstream end of said second section and is in open communication with said second chamber 16. Said third chamber 17 also has a length greater than its diameter but its diameter is less than the diameter of said second chamber. It will be particularly noted that the bottom of said third chamber 17 is in horizontal alignment with the bottom of said second chamber 16.

Axially positioned in the upstream end wall of said first chamber 14 are means comprising opening 22 for introducing a make hydrocarbon along the axis of said first chamber. Said make hydrocarbon introduction means can comprise any suitable means for introducing either a stream of liquid hydrocarbon, a stream of vaporized hydrocarbon, a stream of normally gaseous hydrocarbon, or a mixture of said hydrocarbon streams. Any suitable introduction means, such as those illustrated in U.S. Patent 2,564,700 can be employed. One such means comprises an outer conduit 18 surrounding a hydrocarbon inlet conduit 19 to form an assembly which is mounted on the front end of the furnace by means of the sleeve and flange arrangement 21 shown, and said conduits 18 and 19 extend into said opening 22.

A first pair of inlet conduits 23 disposed in the upstream end portion of chamber 14, one extending through the upper portion of the cylindrical wall of said first chamber 14 and the other extending through the lower portion of said cylindrical wall comprises means for introducing gases comprising a free oxygen-containing gas into said first chamber substantially tangential to the cylindrical wall thereof. A second pair of like disposed inlet conduits 24 further comprises said means for introducing a free oxygen-containing gas into said first chamber. It will be noted that said second pair of inlet conduits is disposed adjacent to and downstream from said first pair of inlet conduits, and each of said second conduits has a larger diameter than each of said first conduits. As an example only, said first inlet conduits can each have a diameter of about 5.5 inches and said second inlet conduits can have a diameter of about 6.5 inches. Both sets of said inlet conduits are employed when FEF carbon black is being manufactured, but only said larger conduits 24 are employed when GPF carbon black is being manufactured. Although not shown in the drawings, it will be understood by those skilled in the art that, if desired or necessary, suitable burner means can be disposed in each of said tangential inlet conduits 23 and 24 for introducing a burning mixture of fuel and free oxygen-containing gas. Said burner means can be any suitable means known in the prior art; for example, see said Patent 2,564,700. The fuel supplied to said burners can be either a normally liquid fuel or a normally gaseous fuel. The free oxygen-containing gas supplied can be either free oxygen, air, or some other gas enriched with free oxygen.

One or more conduits 26 extends radially through the wall of said second chamber 16 and comprises means for introducing a reaction quenching liquid into said second chamber. Said quenching liquid is normally water supplied in liquid form but can be any other suitable liquid. Said inlet means 26 can comprise any suitable means known to the art, for example, such as that illustrated in U.S. Patent 3,009,784. Said quench liquid inlet means 26 can be disposed at any suitable position along the length of said second chamber 16, depending upon the type of make hydrocarbon being introduced into the furnace, the amount of said make hydrocarbon, and the desired properties of the carbon black product, as will be understood by those skilled in the art. If desired, said chamber 16 can be provided with a plurality of sets of quench liquid inlet means disposed at different positions along the length of said chamber 16.

One or more quench liquid inlets 27 can also be provided for introducting quench liquid into the interior of said third chamber 17. The above remarks made in connection with quench liquid inlets 26 also apply to said quench liquid inlets 27.

Figure 5:
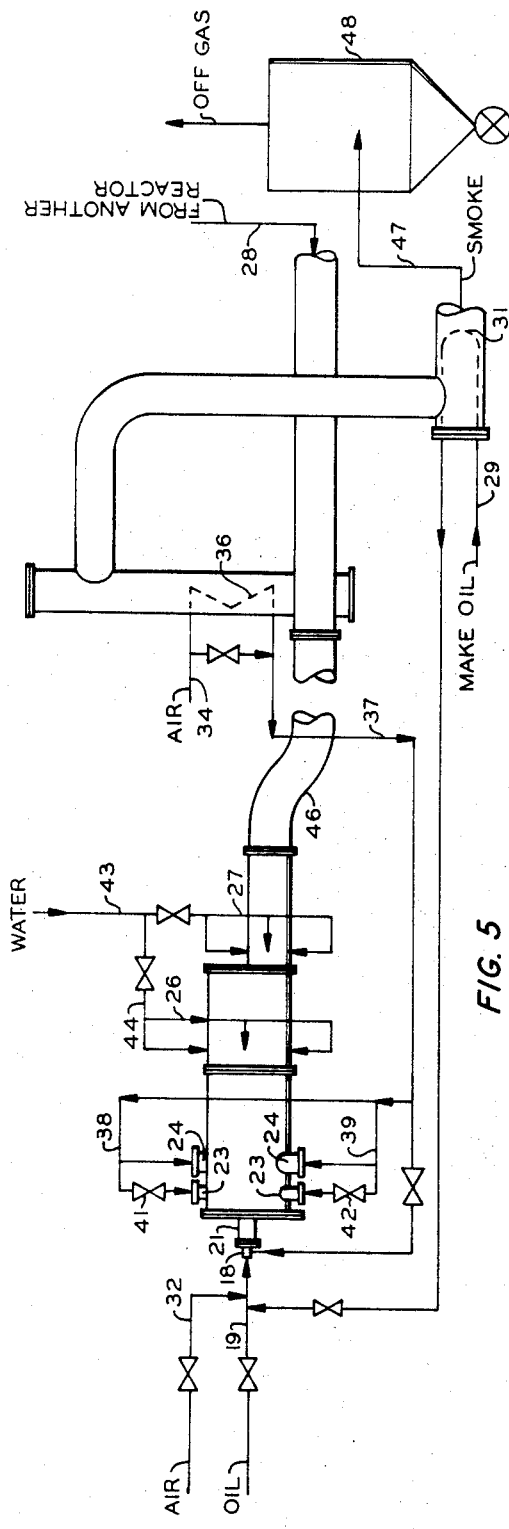
FIGURE 5 is a diagrammatic illustration of a carbon black plant wherein there is employed a furnace as illustrated in FIGURE 1.
Figure 3:
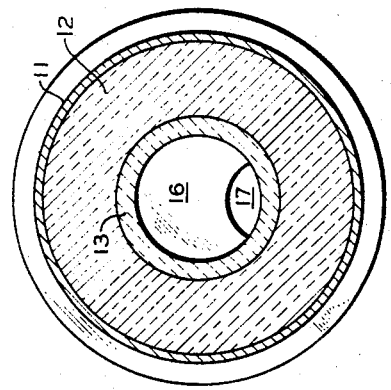
FIGURE 3 is a view of said furnace taken along the line 3—3 of FIGURE 1.
Figure 4:
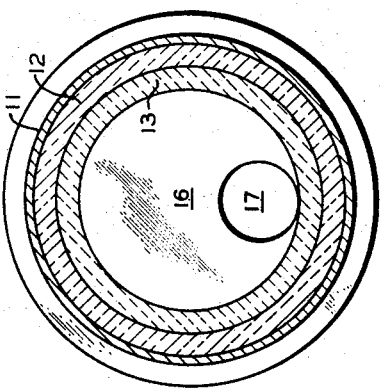
FIGURE 4 is a view of said furnace taken along the line 4—4 of FIGURE 1.
Figure 2:
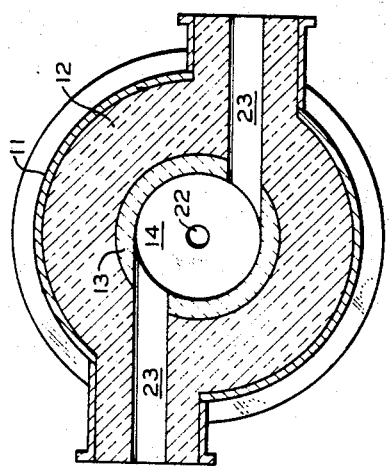
FIGURE 2 is a view of said furnace taken along the line 2—2 of FIGURE 1.

Referring now to FIGURE 5, there is shown an entire carbon black plant wherein there is employed a furnace like that illustrated in said FIGURES 1–4. Only one furnace has been shown, but other similar furnaces can be employed with their smoke entering the system through conduit 28. In the operation of the apparatus illustrated in FIGURE 5, a make hydrocarbon is introduced via conduit 19, or if desired said make hydrocarbon can be introduced via conduit 29, preheated by heat exchange means 31, and then introduced into said conduit 19. Atomizing air from conduit 32 can be employed to atomize said make hydrocarbon if desired or necessary. A stream of "jacket air" is introduced via conduit 37 into conduit 18 surrounding said conduit 19, if desired, to reduce deposits of carbonaceous material on the end of conduit 19. Said conduit can terminate as an open-ended pipe or can be provided with any suitable nozzle means. Air or other free oxygen-containing gas is passed via conduit 34, preferably preheated in heat exchanger means 36, and then passed via conduit 37 into headers 38 nad 39 for introduction into said first chamber 14 by means of inlet ports 23 and 24. Valves 41 and 42 are supplied for controlling the inlet of said air through inlet conduits 23 and/or 24. Although not shown in the drawings, it will be understood that suitable conduit means will be provided for introducing a fuel into admixture with the air in conduits 38 and 39 when burners are employed in ports 23 and 24.

Heat is provided for converting the make hydrocarbon to carbon black, either by combustion of a portion of the make hydrocarbon or by combustion of the fuel introduced in admixture with the air. In either event, the conversion occurs due to heat transferred from the hot products of combustion which initially surround the make hydrocarbon in the first chamber 14. The hot combustion products, the partially decomposed and any unconverted make hydrocarbon and other reaction products are then passed into the larger diameter second chamber 16 where the decomposition of the make hydrocarbon continues.

When FEF carbon black is being produced quench water is introduced from conduit 43 into header 44 for introduction into said second chamber 16 via quench inlets 26. When GPF carbon black is being manufactured said quench water is introduced into said third chamber via quench inlets 27. When no quench liquid is introduced via inlets 27, as in making FEF carbon black, said third chamber serves as a transfer conduit. It is desired to adjust the make oil rate, and the quench point in either said second chamber 16 or said third chamber 17, so that there will be obtained the maximum production of a tar-free carbon black, as defined in commerce. The tar content of the carbon black can be determined by means of the photelometer test, details of which can be found in said U.S. Patent 3,009,784.

Whether the quench water is introduced via inlets 26 or via inlets 27, carbon black is present in the vicinity of the junction between chamber 16 and the third chamber 17. The gaseous components sweeping from chamber 16 into chamber 17 carry with them substantially all of the carbon black present in chamber 16, and prevent any substantial accumulation therein.

Smoke from the furnace is discharged via conduit 46, passed in heat exchange at 36 and 31, and then passed via conduit 47 into carbon black separation means 48 for the recovery of the carbon black product therefrom. Said carbon black separation means 48 can be any suitable means known to the art.

The following example will serve to further illustrate the invention.

EXAMPLE

A furnace is constructed as shown in FIGURES 1–4, inclusive, and having the following dimensions:

| | |
|---|---|
| Length A (chamber 14) | 10 feet 7 inches. |
| Length B (chamber 16) | 9 feet ¾ inch. |
| Length C (chamber 17) | 9 inches. |
| Length D (chamber 17) | 9¼ inches. |
| Length E (chamber 17) | 5 feet 2 inches. |
| Length from upstream end wall of first chamber 14 to quench inlets 26 | 13 feet 11¾ inches. |
| Length from upstream end wall of first chamber 14 to quench inlets 27 | 22 feet 2⅜ inches. |
| Internal diameter of first chamber 14 | 24 inches. |
| Internal diameter of second chamber 16 | 40 inches. |
| Internal diameter of third chamber 17 | 18 inches. |

This furnace is operated to produce either FEF or GPF carbon black with the operating conditions and product properties set forth in Table I below.

TABLE I

| | Making FEF Carbon Black | Making GPF Carbon Black |
|---|---|---|
| Operating Conditions: | | |
| Make oil quality, BMCI | 112 | 112 |
| Make oil charge rate, gal./hr | 420 | 400 |
| Make oil preheat temp., °F | 550 | 550 |
| Tangential air rate, M c.f.h | 153 | 125 |
| Tangential air temp., °F | 500 | 500 |
| Jacket air rate, M c.f.h | 4 | 4 |
| Atomizing air rate, M c.f.h | 4.5 | 4 |
| Carbon Black Product: | | |
| Yield, lbs./gal | 4.6 | 4.7 |
| Photelometer | 92 | 92 |
| $N_2$ Surface area, sq. m./g | 44 | 28 |
| Oil absorption, cc./g | 1.1 | 0.9 |

In runs under the above conditions and other operating conditions extending over prolonged periods of time it has been found there is no settling of carbon black in second chamber 16.

While the invention has been illustrated by the above example employing a furnace having specific dimensions, the invention is not so limited. Said dimensions have been employed for illustrative purposes only and represent one presently preferred embodiment of the furnace of the invention. Any and all of said dimensions can be varied. The only requirements are that the length of first chamber 14 be greater than its internal diameter, e.g., said length being from 1.5 to 10 times said diameter; that the length of said second chamber be greater than its internal diameter and that the internal diameter of said second chamber be greater than the internal diameter of said first chamber, e.g., the length of said second chamber being from 1.2 to 10 times its internal diameter, and the internal diameter of said second chamber being from 1.1 to 2.4 times the internal diameter of said first chamber; and that the length of said third chamber also be greater than its internal diameter and that said diameter of said third chamber be less than the internal diameter of said first chamber, e.g., the length of said third chamber being from 2 to 8 times its internal diameter, and the internal diameter of said third chamber being from 0.4 to 0.9 times the internal diameter of said first chamber.

For example, in the presently preferred embodiments of the invention said first chamber has a length of from about 10 to about 11 feet and an internal diameter of about 24 inches, said second chamber has a length of from about 9.5 to about 10 feet and an internal diameter of about 40 inches, and said third chamber has a length of about 5 to about 6 feet and an internal diameter of about 15 inches.

It will also be understood that while the furnace has been illustrated for making certain grades of FEF and GPF carbon black, said furnace can be employed for making other grades of FEF and GPF carbon black, as well as other types of carbon black.

While certain embodiments of the invention have been described for illustrative purposes, the invention obviously is not limited thereto. Various other modifications will be apparent to those skilled in the art in view of this disclosure. Such modifications are within the spirit and scope of the invention.

I claim:

1. Apparatus for the production of carbon black, including a furnace comprising: a first generally cylindrical, horizontally disposed chamber having a length greater than its diameter; a second generally cylindrical, horizontally disposed chamber having a length greater than its diameter and a diameter greater than the diameter of said first chamber, said second chamber being in communication with and in axial alignment with said first chamber; a third generally cylindrical, horizontally disposed chamber having a length greater than its diameter and a diameter less than the diameter of said first chamber, said third chamber being in communication with said second chamber with the bottom of said third chamber in horizontal alignment with the bottom of said second chamber; means for introducing a reactant hydrocarbon along the axis of said first chamber; inlet conduit means for introducing a gas comprising a free oxygen-containing gas into said first chamber adjacent the upstream end thereof; and means for introducing a reaction quenching liquid into said second chamber.

2. Apparatus according to claim 1 which further comprises means for introducing a reaction quenching liquid into said third chamber.

3. Apparatus according to claim 1 wherein said means for introducing said free oxygen-containing gas comprises a first pair of inlet conduits, one extending through the upper portion of said cylindrical wall and the other extending through the lower portion of said cylindrical wall of said first chamber.

4. Apparatus according to claim 3 wherein said means for introducing said free oxygen-containing gas also comprises a second pair of inlet conduits, one extending through the upper portion of said cylindrical wall and the other extending through the lower portion of said cylindrical wall, said second pair of conduits is disposed adjacent to and downstream from said first pair of conduits, and each of said second conduits has a larger diameter than each of said first conduits.

5. Apparatus according to claim 1 wherein said first chamber has a length of from 1.5 to 10 times its internal diameter; said second chamber has a length of from 1.2 to 10 times its internal diameter and said diameter of said second chamber is from 1.1 to 2.4 times the internal diameter of said first chamber; and the length of said third chamber is from 2 to 8 times its internal diameter and the internal diameter of said third chamber is from 0.4 to 0.9 times the internal diameter of said first chamber.

6. Apparatus according to claim 1 wherein said first chamber has a length of from about 10 to about 11 feet and an internal diameter of about 24 inches, said second chamber has a length of from about 9.5 to about 10 feet and an internal diameter of about 40 inches, and said third chamber has a length of about 5 to about 6 feet and an internal diameter of about 15 inches.

References Cited

UNITED STATES PATENTS

| | | | |
|---|---|---|---|
| 2,800,394 | 7/1957 | Peters | 23—209.4 |
| 3,009,784 | 11/1961 | Krejci | 23—209.4 |
| 3,013,865 | 12/1961 | Webster et al. | 23—259.5 |
| 3,307,911 | 3/1967 | Krejci | 23—209.4 |

EDWARD J. MEROS, *Primary Examiner.*